United States Patent [19]

Letardi

[11] Patent Number: 5,070,513

[45] Date of Patent: Dec. 3, 1991

[54] TRANSVERSE DISCHARGE EXCITED LASER HEAD WITH THREE ELECTRODES

[75] Inventor: Tommaso Letardi, Rome, Italy

[73] Assignee: ENEA Comitato Nazionale per la Ricerca e per lo Sviluppo dell'Energia Nucleare e Delle Energie Alternative, Rome, Italy

[21] Appl. No.: 520,552

[22] Filed: May 8, 1990

[30] Foreign Application Priority Data

May 12, 1989 [IT] Italy ............................. 47954 A/89

[51] Int. Cl.⁵ .................................................. H01S 3/0971
[52] U.S. Cl. ................................... 372/83; 372/86; 372/81
[58] Field of Search .............................. 372/83, 86, 87

[56] References Cited

U.S. PATENT DOCUMENTS

| 3,848,202 | 11/1974 | Hyne | 372/87 |
| 4,319,202 | 3/1982 | Schuöcker et al. | 372/87 |
| 4,412,333 | 10/1983 | McLellan | 372/87 |

*Primary Examiner*—Frank Gonzalez
*Assistant Examiner*—Susan S. Morse
*Attorney, Agent, or Firm*—Stevens, Davis, Miller & Mosher

[57] ABSTRACT

A new configuration of the electrodes of a transverse discharge pumped gas laser is disclosed, in which the electrode connected to ground and the electrode connected to the main condenser bank are placed on the same plane so as to face a third electrode connected to a high impedance. There are two distinct discharge regions, one of which is the back path of the current passing through the first discharge region.

20 Claims, 5 Drawing Sheets

TRANSVERSE DISCHARGE EXCITED LASER HEAD WITH THREE ELECTRODES

The present invention relates to a transverse discharge gas pumped laser and in particular the configuration of a laser head excited by transverse discharge, in which three electrodes mounted so as to provide two separate discharge regions are provided.

BACKGROUND OF THE INVENTION

According to the current state of art the configuration commonly used for the placement of the electrodes in a transverse discharge gas pumped laser is illustrated in FIG. 1 showing two opposite electrodes placed side by side to conductors for the back current. The operation of a transverse discharge laser of this kind can be easily illustrated with reference to the diagram of FIG. 2. A suitable differential voltage is applied across the two opposite electrodes E1, E2 by means of a condenser bank charged at the voltage V°. The gas made previously conductive by preionization with UV-fotons or X-rays is crossed by a high electric pulse current transferring to the gas the necessary energy to bring atoms or molecules at the excited level from which they should decay to provide the laser effect.

This geometry known as TEA (Transversely Excited Atmospheric-pressure) is used either when very short excitation time of the gas or short laser pulses ($CO_2$) are desired or because the discharge in the used gas is not stable so that the discharge must finish before the instability condition is established (excimer laser). During the discharge the system can be used as a RLC circuit, where C essentially is the condenser bank charged at the voltage V°, L is the inductance of the connection between condenser bank and laser head, R is the resistance of the discharge. It is then evident that the transverse discharge arrangement, with respect for example to the longitudinal discharge arrangement, allows both L and R to be reduced under the same active gas volume and energy stored in the condenser bank. Therefore, energy is more rapidly transferred to the gas.

The transverse discharge arrangement has, however, along with the previously described advantage some negative aspects summarized herebelow:

1) The two electrodes have to be sidewise integrated with conducting studs covered by an insulating layer which should provide the correct path of the current. These studs should be near the electrodes to minimize, but not to a great extent, the inductance in order to avoid electrical discharge problems which can be only partially avoided by the insulating covering. Furthermore, the construction of the studs should be highly transparent to the gas flow (large void-solid content ratio, i.e. studs spaced a lot, net with spaced meshes), which is in contrast with the necessity of the discharge circuit to have a low impedance (i.e. requesting a construction with opposite features). Furthermore, the studs should be aerodynamically profiled (i.e. a complicated machining) to minimize the turbulence in the active volume, thus impairing the optical quality of the laser beam. Again, when the insulating material covering the studs is hit by the hot and reactive gases after the discharge, chemical reaction changing the useful mean-life of the gas can easily occur (thus increasing the operation cost due to the increase of spares).

2) The pumping technique of an excimer laser by transverse discharge requires the use of switches able to withstand high peak currents (up to 100 KA) with high current derivatives (for example dI/dt greater than $10^{12}$ A/s) to have a high efficiency. The employed solutions always are a compromise. In fact:

the use of thyratron, as it is widely made, reduces the efficiency due to the limited derivative dI/dt; again, the use of the characteristics at their limits reduces the mean-life;

the use of a spark gap allows the requested performance in terms of dI/dt and Imax to be achieved, but the mean-life of such means is always limited (max. $10^3$ pulses) and this is a great limit for sources designed to operate at high repetition frequency (for example, in a source operating at 1 kHz the mean-life of the spark gap would be about 30 working hours).

switches with saturable magnets can be used. In such a case the requested values of Imax and dI/dt can be obtained as well as a mean-life compatible with a prolonged use, but such systems are cumbersome, expensive and above all less flexible as they are designed for a determined working point (in terms of energy transferred by each pulse, operation voltage, a.s.o.) which cannot be easily changed.

3) It should be added that a device used by Long for the first time and successively by many others allows the performance of the excimer lasers to be expanded. Such a device is known as "prepulse" circuit. The disclosure of such a device is made evident by the normal operation mode of a transverse discharge laser. In such lasers the discharge process develops through two separate phases. In fact, the preionization sources currently used produce an electron density of $10^7$ to $10^{11}$ e/cm$^3$, which is far away from the requested density of the discharge ($10^{14}$–$10^{15}$ e/cm$^3$).

In the initial phase of the discharge (<20 ns) a high electrical field is requested in order to increase the density of the electrons, and in the subsequent phase a much lower electrical field holding the discharge is requested. This double function is normally performed by only one circuit using in practice the impedance variation of the discharge and an auxiliary condenser of low capacitance (peaking condenser) to produce an electrical field varying by about a factor 2 from the inital phase to the following. The ideal value is, however, greater than 3. Under ideal conditions, in the Long's work two circuits operating in succession have been used (see FIG. 3): at the beginning switch $I_0$ connecting condenser $C_0$ charged at high voltage $V_0$ to small capacities is closed, thus providing the high electrical field of multiplication, and immediately afterwards switch $I_1$ connected to condenser $C_1$ of great value and charged at a much lower voltage is closed, thus providing the most of gas excitation energy. By this contrivance, i.e. by separately optimizing the electrical fields of the multiplication phase and discharge phase, two important results have been achieved: the efficiency of an excimer XeCl-laser has been brought from 2% to 4.2% (Long et al.), and the duration of the laser pulse has been brought from about 150 ns to over 500 ns. The use of such contrivance always requires the use of an auxiliary switch (spark gap, saturable inductance, ausiliary electrode) which isolates the electrode of the condenser bank when the multiplication pulse is applied.

4) In order to complete the outline of the present state of art it should be appreciated that the socalled MOPA (Master Oscillator Power Amplifier) construction has been resorted to, in which two laser chambers are operated at the same time in order to satisfy the request of beams of very high quality (narrow spectrum, low divergency). According to such construction the beam with the requested features is formed in a master oscillator (by means of rasters, etalon, unstable cavities, a.s.o.). Such beam is then amplified by a power amplifier. Such circuit requires for its operation a low power unit (not necessarily at high efficiency) synchronized with accuracy with a power unit having high efficiency. Of course, except for the advantage of the double discharge region, the system suffers from all of the previously described problems.

SUMMARY OF THE INVENTION

The present invention seeks to avoid the above mentioned problems by providing a transverse discharge excited laser head, allowing:

a) the back current conductors hindering the gas flow to be avoided;

b) the MOPA technique to be used without synchronization problems and without spark gap or magnetic pulse compressors;

c) the "prepulse" technique to be used without the necessity of insulating the electrode during the "prepulse" by means of spark gap or magnetic switches (saturable magnets).

This has been achieved by providing a laser head and at least three electrodes, two of which are connected to ground and the main condenser bank, respectively, and the third electrode, which is called auxiliary electrode, is not connected either to ground with low impedance or to the main condenser bank. The three electrodes are reciprocally mounted so as to form two separate discharge regions, one of which is the back current path of the current passing through the other discharge region.

With such a configuration according to the invention the circuit of the discharge is closed through the electrodes so that further metal electrodes hindering the gas flow are not necessary.

Furthermore, the disclosed laser head advantageously allows the above mentioned "prepulse circuit to be easily provided as the auxiliary electrode permits a multiplication prepulse of preionization to be applied to the active region of the gas.

BRIEF DESCRIPTION OF THE DRAWING

Further features and advantages of the present invention will be apparent from the following detailed description with reference to the annexed drawing showing as a nonlimitative example some preferred embodiment compared with the known technique.

In the drawing.

DESCRIPTION OF THE PREFERRED EMBODIMENTS

Figure 1:
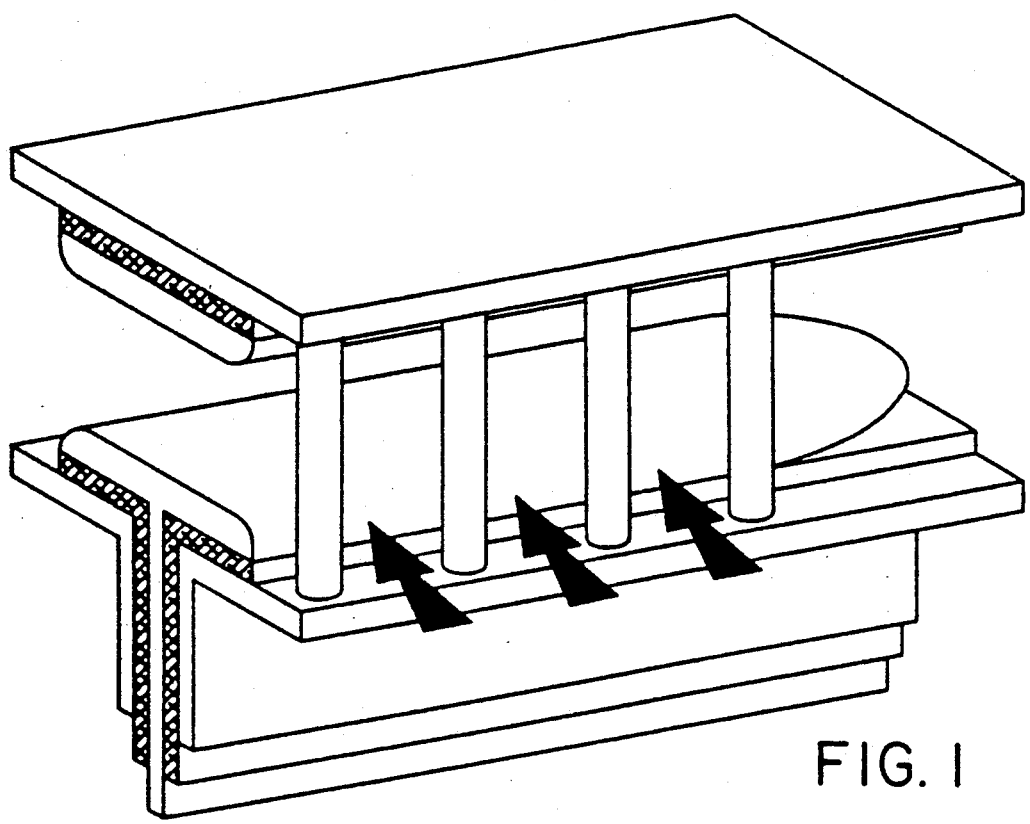
FIG. 1 shows the commonly used configuration for the placement of the electrodes in a transverse discharge pumped gas laser.
Figure 2:
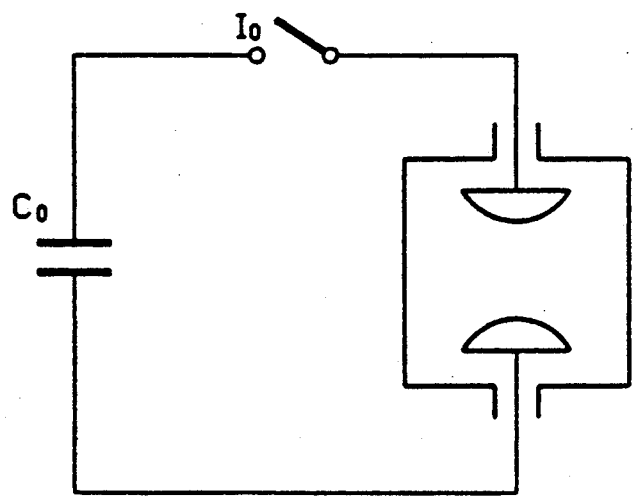
FIG. 2 is an electrical diagram of the same laser.
Figure 3:
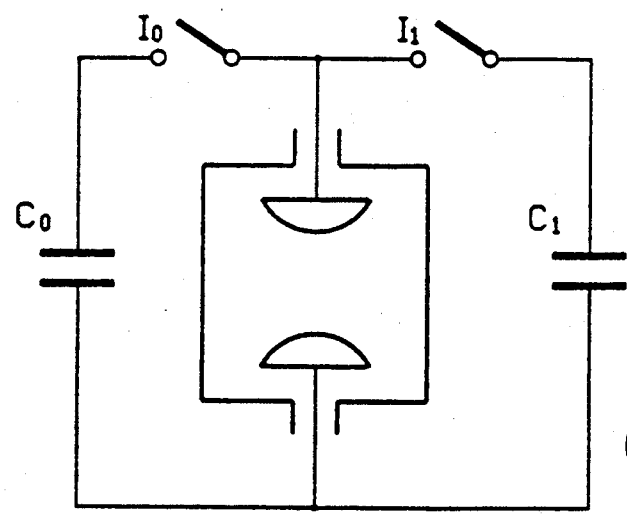
FIG. 3 is an electrical diagram of a transverse discharge laser operating according to the prepulse technique.
Figure 4:
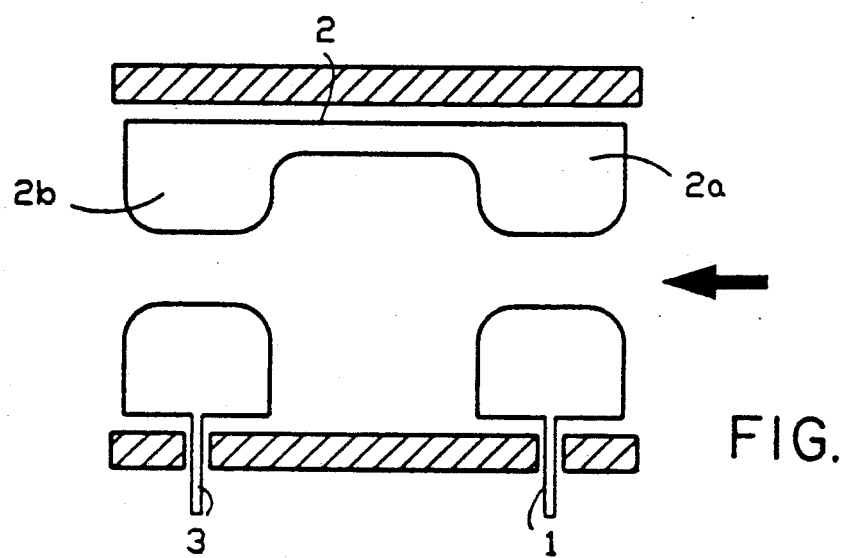
FIG. 4 is a longitudinale section view of the laser head with three electrodes according to the invention.

With reference to FIGS. 4 to 7, the construction of a laser head of the present application according to a preferred embodiment is essentially characterized by an auxiliary electrode designated by 2 lying on a plane parallel to that of the other two electrodes 3 and 1. Electrode 2 is provided at its longitudinal ends with two electrode shoes 2b and 2a projecting inwards and facing the electrodes 3 and 1, respectively. The two electrodes shoes 2a and 2b are suitably shaped so as to provide an uniform electrical field as well as the two opposite electrodes 1 and 3. Electrode 2 is not connected with low impedance to ground nor to the main condenser bank.

The discharge current from the ground electrode 1 reaches the auxiliary electrode 2 in the region 2a and returns to the other end of the condenser (electrode 3). There are essentially two distinct discharge regions: 1-2a and 2b-3.

The discharge can be initiated according to two different modes:

A) An increasing voltage is applied across electrodes 1 and 3 (FIG. 5), and electrode 2 is held to ground by a high resistance. When the voltage across electrodes 2 and 3 has reached a suitable value, regions 1-3 and 1-2 are preionized. Region 3-2 starts the discharge and the voltage goes quickly to null, while voltage across electrodes 1 and 2a increases, thus starting the discharge which closes the circuit. The gap 3-2b operates as a spark gap for the region 1-2a.

A condenser $C_2$ of low capacitance (peaking capacitor) connected in parallel to gap 1-2 between electrode 2 and ground (FIG. 6) can increase the efficiency of this operating mode.

B) A condenser bank charged at voltage $V_3$ is connected across electrodes 3 and 1 (FIG. 7), and regions 3-2b and 2a-1 are preionized. The voltage is selected so that under these conditions there is no discharge. A short pulse is applied to electrode 2 so as to start the multiplicative phase and successively the discharge phase. Under these conditions it is operated with a prepulse mode using an auxiliary high impedance electrode.

Figure 7:
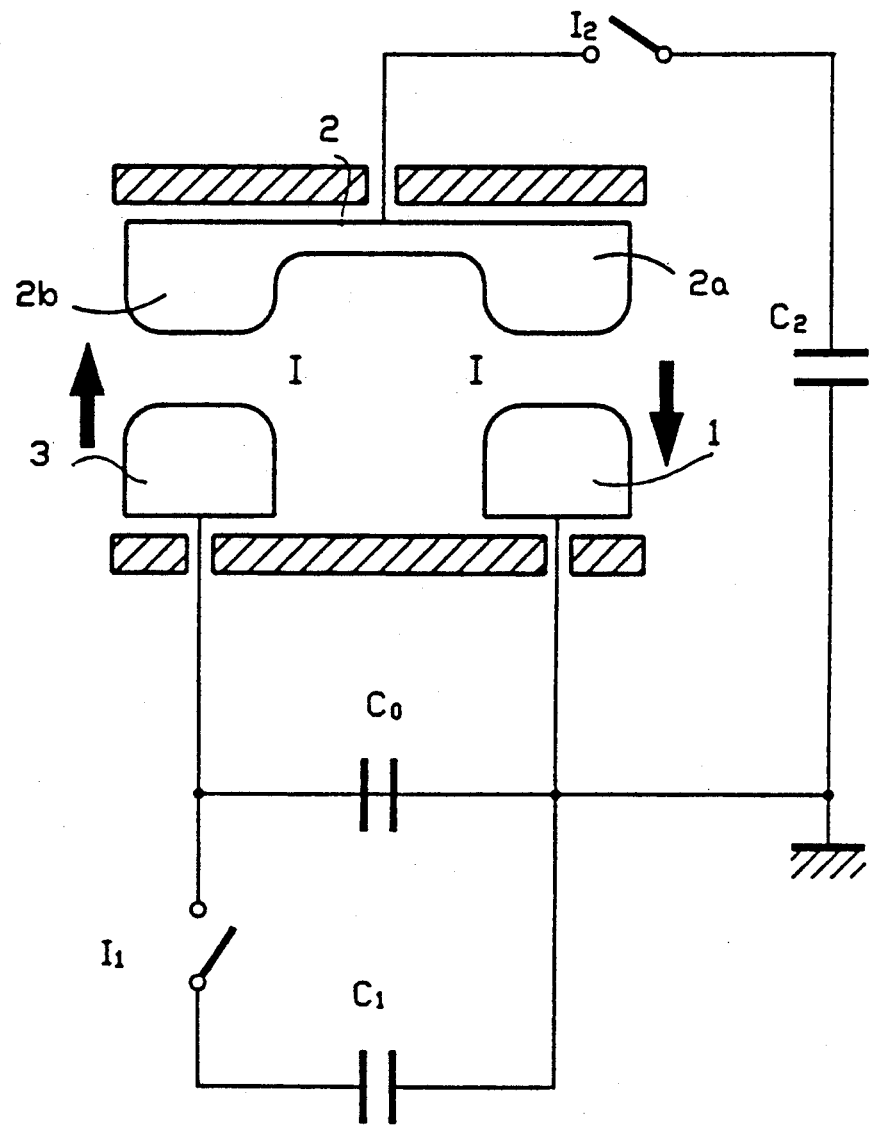
FIG. 7 is a third laser diagram using the head of FIG. 4 with a discharge caused by a prepulse.

It should be appreciated that in the case of FIG. 7 the gaps across the electrodes should have different sizes to allow the discharges to be simultaneous.

Figure 8:
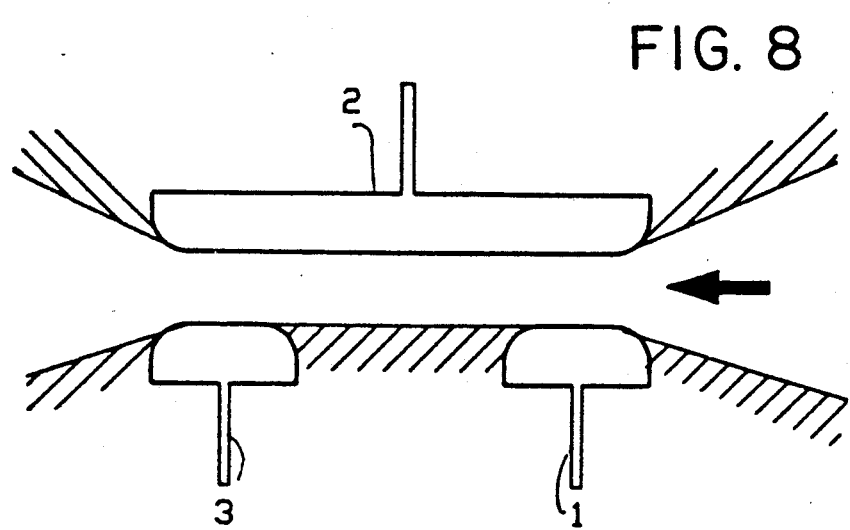
FIG. 8 shows a further embodiment of a laser head with an auxiliary electrode without electrode shoes and the other two electrodes separated by an insulating layer suitably shaped to minimize the resistance to the gas flow.
Figure 5:
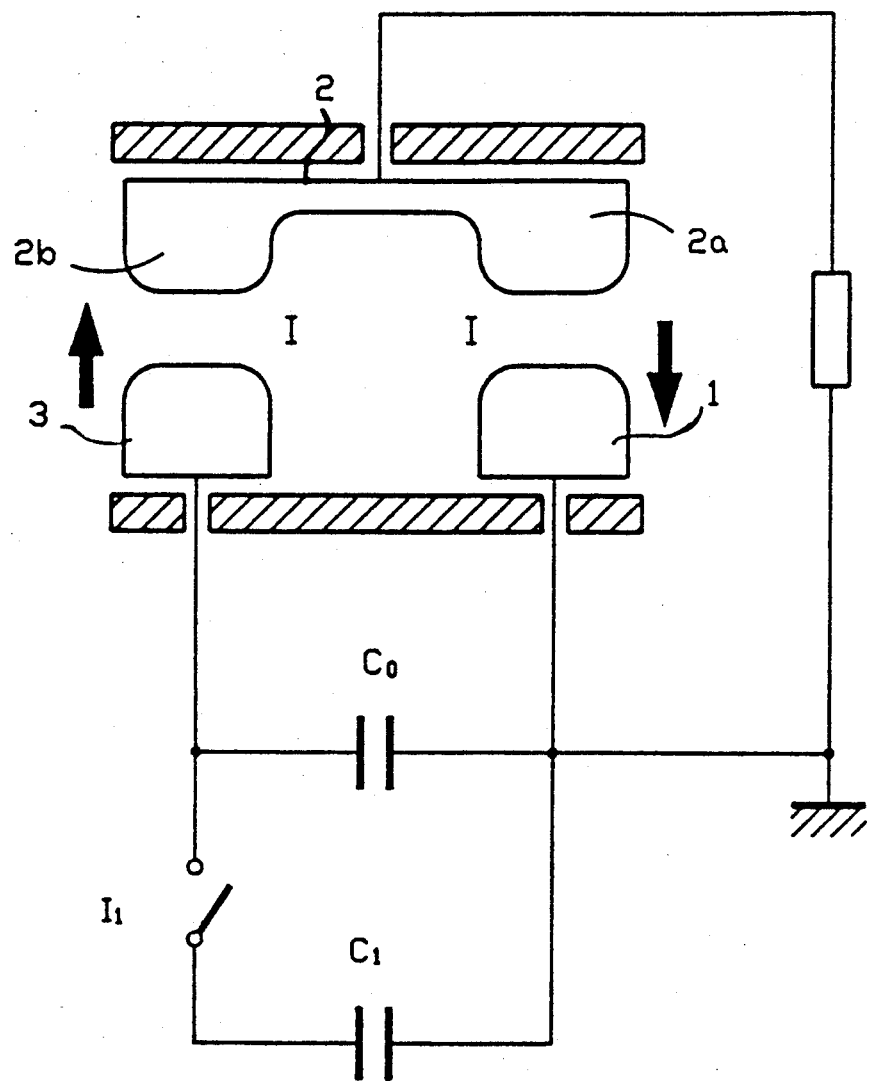
FIG. 5 is a first operating diagram of a laser using the head of FIG. 4.
Figure 6:
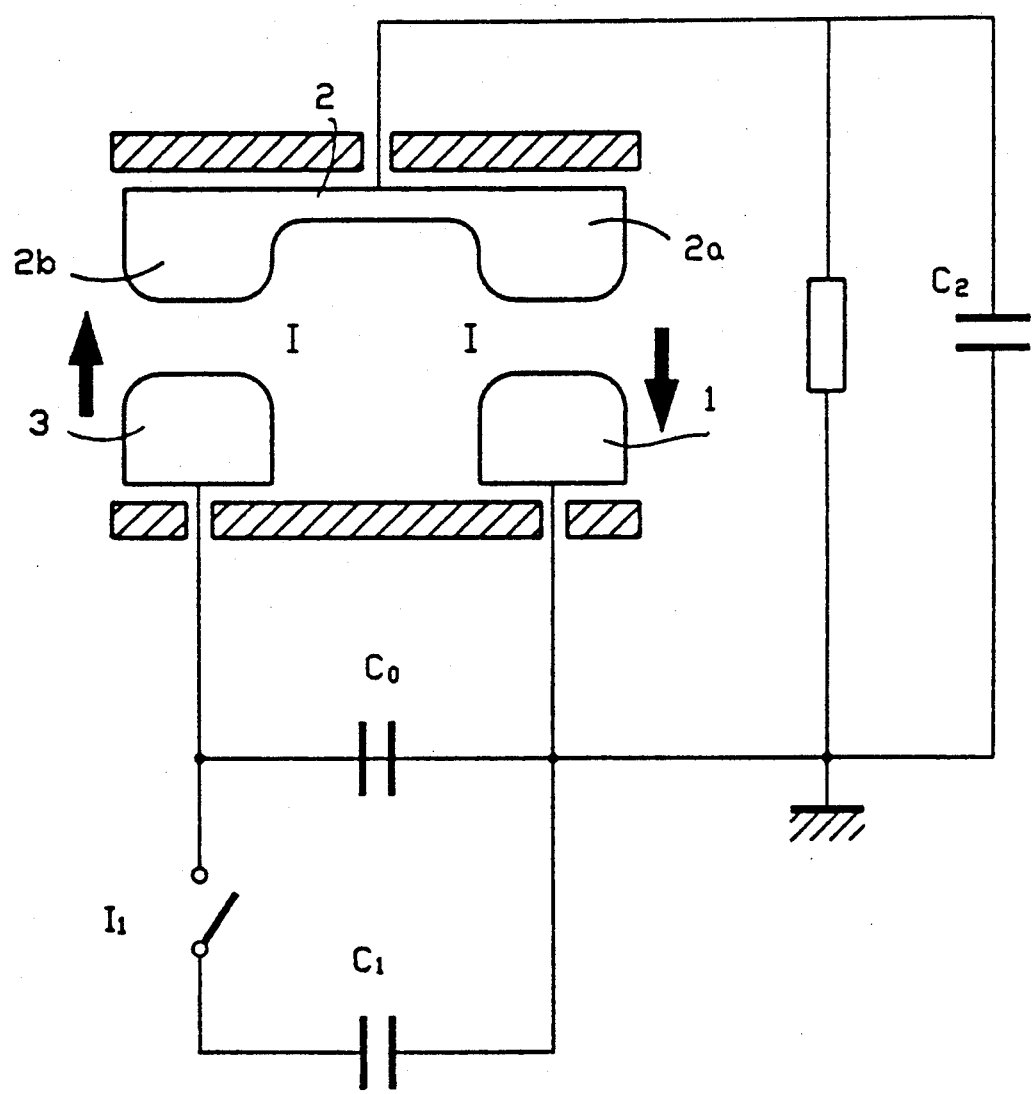
FIG. 6 is a second electrical diagram with a low capacitance condenser in parallel with the discharge electrodes 1-2.

An alternative embodiment of the auxiliary electrode is shown in FIG. 8. The two electrode shoes facing the opposite electrodes are not provided, while there is a layer of insulating material between the opposite electrodes which is suitably shaped to reduce to a minimum the resistance to the gas flow.

The advantages of the proposed construction can be easily disclosed with reference to the problems encountered in the use of the transverse discharge pumping methods and previously mentioned in connection with the known techniques:

The necessity of back current electrodes is avoided as in the proposed solution there is a gap as back current path of the gap parallel thereto. Thus, the dynamic resistance to the gap flow is eliminated, and the hot gases after the discharge do not contact the insulating materials, the turbulence is avoided and the mechanical design is simplified.

The problem of the quick switching is solved as an active region (3-2b) operates also as spark gap for the region at high efficiency (2a-1). Thus, region 3-2b operating as oscillator can have a low efficiency. Such operation relates to the operation mode previously indicated at A.

The auxiliary electrode connected with high impedance can be used as electrode to provide the multiplication phase of the preionization according to the above described point B. Thus, the proposed diagram can be used to easily provide the prepulse circuit.

There are two active regions which are automatically synchronized due to the circuit closing mode. This allows the MOPA diagram with synchronization between oscillator and amplifier to be used.

I claim:

1. Transverse discharge excited laser head, comprising a first electrode connected to ground, a second electrode spaced from said first electrode and connected to a condenser bank and a third electrode suitably spaced from said first and second electrodes, said third electrode facing the other two electrodes so as to form two distinct regions, one of which is the back current path of the other region so as to close the electrical circuit without using further conductors hindering the cross flow of the gas perpendicular to said discharges and to the length of the electrodes.

2. The transverse discharge excited laser head of claim 1, further comprising a high impedance connected to said third electrode, said third electrode being easily pulsed in order to start a multiplicative phase and successively a discharge phase.

3. The transverse discharge excited laser head of the claim 1, wherein the first and the second electrodes lie on the same plane and are parallel to each other.

4. The transverse discharge excited laser head of the claim 1, wherein the third electrode is parallel to the other two electrodes.

5. The transverse discharge excited laser head of the claim 1, wherein the width of the third electrode is essentially equal to the sum of the gap across the other two electrodes and the widths thereof.

6. The transverse discharge excited laser head of claim 1, wherein the third electrode has at opposite sides along its width two electrode shoes, each of whom faces one of the first and second electrodes.

7. The transverse discharge excited laser head of claim 1, wherein the third electrode is formed of a body without electrode shoes.

8. The transverse discharge excited laser head of claim 6, wherein the two electrode shoes of the third electrode are suitably shaped so as to provide an uniform electrical field in the same way as the first and second electrodes.

9. The transverse discharge excited laser head of claim 1, further comprising between the first and the second electrodes an insulating layer suitably shaped so as to keep the minimum the resistance to the gas flow.

10. The transverse discharge excited laser head of the preceding claim 1, wherein the region of the first discharge has the function of a quick switch for the discharge in the second region, thus eliminating the peak power switch normally used in the conventional transverse discharge lasers.

11. The transverse discharge excited laser head of claim 2, wherein the first and the second electrodes lie on the same plane and are parallel to each other.

12. The transverse discharge excited laser head of claim 2, wherein the third electrode is parallel to the other two electrodes.

13. The transverse discharge excited laser head of claim 3, wherein the third electrode is parallel to the other two electrodes.

14. The transverse discharge excited laser head of claim 11, wherein the third electrode is parallel to the other two electrodes.

15. The transverse discharge excited laser head of claim 2, wherein the width of the third electrode is essentially equal to the sum of the gap across the other two electrodes and the widths thereof.

16. The transverse discharge excited laser head of claim 3, wherein the width of the third electrode is essentially equal to the sum of the gap across the other two electrodes and the widths thereof.

17. The transverse discharge excited laser head of claim 4, wherein the width of the third electrode is essentially equal to the sum of the gap across the other two electrodes and the widths thereof.

18. The transverse discharge excited laser head of claim 11, wherein the width of the third electrode is essentially equal to the sum of the gap across the other two electrodes and the widths thereof.

19. The transverse discharge excited laser head of claim 12, wherein the width of the third electrode is essentially equal to the sum of the gap across the other two electrodes and the widths thereof.

20. The transverse discharge excited laser head of claim 13, wherein the width of the third electrode is essentially equal to the sum of the gap across the other two electrodes and the widths thereof.

* * * * *